Oct. 17, 1967  E. J. TOSCANO  3,348,156
DIGITAL NUMBER REGISTER
Original Filed Dec. 3, 1962  2 Sheets-Sheet 1

Esteban J. Toscano,
INVENTOR.
BY.
E. F. Oberhem
AGENT.

Esteban J. Toscano,
INVENTOR.
BY.
AGENT.

United States Patent Office
3,348,156
Patented Oct. 17, 1967

3,348,156
DIGITAL NUMBER REGISTER
Esteban J. Toscano, Los Angeles, Calif., assignor to Hughes Aircraft Company, Culver City, Calif., a corporation of Delaware
Original application Dec. 3, 1962, Ser. No. 241,630, now Patent No. 3,218,532, dated Nov. 16, 1965. Divided and this application Apr. 15, 1965, Ser. No. 448,524
6 Claims. (Cl. 328—42)

ABSTRACT OF THE DISCLOSURE

An arrangement for algebraically combining two numbers in a unidirectional counter or register, using bistable elements such as flip-flops, in which the logical interconnection of the flip-flops permits the insertion of the two numbers in selected groups of flip-flops requiring a total number of pulses for counting out the register equal to the algebraic sum of the two numbers.

This application is a division of application Ser. No. 241,630, now Patent 3,218,532, patented Nov. 16, 1965.

In certain of its aspects this invention is related to a copending patent of the applicant, 3,252,147, issued May 17, 1966, and assigned to the assignee of this invention.

This invention relates generally to unidirectional digital number registers and more particularly to such registers or counters in which numbers may be algebraically combined.

Unidirectional counters or registers are useful in incremental positioning systems such as found in numerical machine tool controls, for instance, wherein movable platens or tables, spindles, etc., are positioned in one or more axes in accordance with programs defined in some suitable type of numerical code. Their use minimizes interstage gating with savings in circuit components and in power requirements for the individual stages.

As used in an incremental positioning system of the type disclosed in the copending patent aforesaid, a number read from a fixed program, such as a tape as an instruction for positioning a machine element in one axis, is inserted in the register. If for any reason this position must be altered, position offset is achieved by generating a second number, independently of the tape and indicative of the magnitude of offset, and inserting this second number in the register. The final position is the algebraic sum of these two numbers.

An object of this invention is to provide a facility permitting the algebraic summation of two numbers in a one-way counter or register.

The aforesaid and other objects and advantages are accomplished in accordance with one embodiment of this invention in an arrangement utilizing a count-down counter or counting register which is provided with an additional minimal storage facility which permits the addition of two numbers therein, the first, in the application described being a number set therein from the program device, and the second being a number set therein in accordance with an adjustment required in the desired position of the part being positioned, with respect to that position which has been programmed.

Other objects and advantages will become apparent from a study of the following specifications when considered in conjunction with the accompanying drawings in which.

Figure 1:
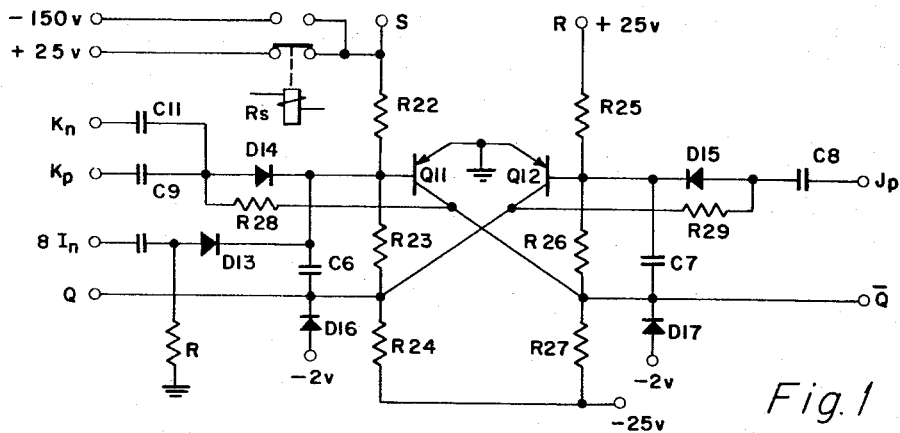
FIG. 1 illustrates a typical flip flop of the type which is employed in the counter circuits of this invention.

A counter of the type described herein provides unidirectional operation, specifically a count-down type of operation, and to this end may comprise successive flip flop stages which are arranged so that the lower order flip flops controls the higher order flip flops in a special cascaded flip flop arrangement to achieve count-down counter operation. A typical flip flop for such a counter may be of the type illustrated in FIG. 1 herein. This flip flop is described in connection with FIG. 4 of a patent to E. J. Toscano 3,252,147, issued May 1, 1966, and is reproduced herein to facilitate understanding of this invention.

This flip flop comprises a pair of transistors Q11 and Q12 of the PNP type which are connected in grounded emitter configuration. The bases and collectors of these transistors are crossconnected in respective voltage divider circuits, the first of which includes resistors R22, R23 and R24, and the second of which includes resistors R25, R26 and R27. The base of transistor Q11 is connected to the common terminal of resistors R22 and R23 of the first named voltage divider and the base of transistor Q12 is connected to the common terminal between resistors R25 and R26 of the second named voltage divider. The collector of transistor Q11 is connected to the common terminal between resistors R26 and R27 of the second voltage divider and the collector of transistor Q12 is connected to the common terminal of resistors R23 and R24 of the first voltage divider.

The respective voltage dividers, during operation of the flip flop, are normally connected between +25 volts and −25 volts. For the purpose of presetting the flip flop to one of its two stable states a selected one of the terminals S or R on the voltage divider circuit may be connected momentarily to −150 volts. When −150 volts is connected to terminal S, for instance, the flip flop is turned on, its "1" representing electrical state, and when −150 volts is connected to the terminal R the flip flop is turned off, its "0" representing electrical state. While the application of −150 volts is shown only to the terminal S by means of a circuit, yet to be described, it is to be understood that this voltage may be applied to either of the terminals S or R, depending upon the electrical state the flip flop is to be set in prior to operation.

Resistors R23 and R26 are respectively shunted by capacitors C6 and C7. Resistors R23, capacitor C6 and resistor R26, capacitor C7, constituting, respectively, the cross-coupling circuits, connect the collector of one transistor to the base of the other transistor to provide fast triggering.

The base circuits of the transistors are provided, respectively, with steering voltage connections to enable switching of the flip flops from one electrical state to the other without uncertainty. These circuits include resistor R28, diode D14 and resistor R29, diode D15 in series, respectively, between the collector and base of the transistor.

The flip flop illustrated may be identified as a J–K type of flip flop in which the applications of input signals to the J input terminal of the flip flop set the flip flop in its "1" representing or "Q" electrical state, and applications of input signals to the K input terminal of the flip flop result in setting of the flip flop to its "0" representing or "$\overline{Q}$" electrical state.

J input signals at terminal $J_p$ are applied to the base of transistor Q12 through a coupling capacitor C8 and the diode D15. K input signals are applied at the terminal $K_p$ or $K_n$ to the base of transistor Q11. Coupling capacitor C9 and C11 couple the respective $K_p$ and $K_n$ terminals to the anode of the diode D14 in the base circuit of transistor Q11.

Another input terminal designated 8I$n$ is coupled through a coupling capacitor and a diode D13 to the base of transistor Q11.

Clamping diodes D16 and D17 are provided, respectively, at the collector circuits to apply a clamping voltage of −2 volts as indicated such that when either transistor Q11 or Q12 is not conducting the associated collector circuit will be clamped at about −2 volts.

The "on" or "1" representing electrical state of this flip flop is approximately a −2 volt voltage state at collector terminal Q and the "off" or "0" representing electrical state is approximately a zero or ground voltage condition at the terminal Q. When the terminal Q is at −2 volts the terminal $\overline{Q}$ is at zero volts. When the terminal Q is at zero volts the terminal $\overline{Q}$ is at −2 volts. For the flip flop to be in its "on" or "1" representing electrical state transistor Q11 is conducting and transistor Q12 is nonconducting. Under this condition the terminal Q is at −2 volts as determined by the voltage clamp at diode D16. As a consequence of current flow in the collector circuit of transistor Q11, including resistor R27, the $\overline{Q}$ terminal of the flip flop will be at approximately "0" volts, in which case the clamping diode D17 is backbiased.

The flip flop is triggered between its two electrical states by cutting off the conducting transistor through application of a positive going voltage pulse to its base. The steering voltage applied by the steering voltage circuits, including resistors R28 and R29, permit control of the flip flop by the simultaneous application of flip flop triggering pulses to both the $J_p$ and $K_p$ input terminals.

FIG. 1 also illustrates a specific circuit for setting the flip flop in its "1" representing electrical state using the principle of negative base bias to effect switching of transistor Q11. This provision, with reference to the flip flops of the Z and F counters, includes the contacts of a flip flop setting relay RS. This relay is provided with a set of normally closed contacts which connects +25 volts to the terminal S and a set of normally open contacts which when closed couple −150 volts to the terminal S. For the arrangement illustrated the relay RS is normally deenergized, in which case the terminal S is coupled to 25 volts. The terminal R is indicated as being coupled to 25 volts. In order to set the flip flop into its "1" representing electrical state the relay RS is energized. As described in Patent 3,252,147 of E. J. Toscano, supra, energization of relay RS takes place when row 1 of the tape is being read. In this condition −150 volts is coupled through the resistor R22 to the base of flip flop Q11. This drives the base of the transistor Q11 negatively with respect to the emitter and transistor conduction takes place. As long as this voltage is applied to the flip flop the flip flop is held in this electrical state, even though positive voltage pulses may be applied to the terminals $J_p$ and $K_p$. With transistor Q11 conducting as described, the output terminal Q is clamped at −2 volts and the output terminal $\overline{Q}$ is approximately at zero volts or ground potential and the flip flop is in its "1" representing electrical state.

Figure 2:
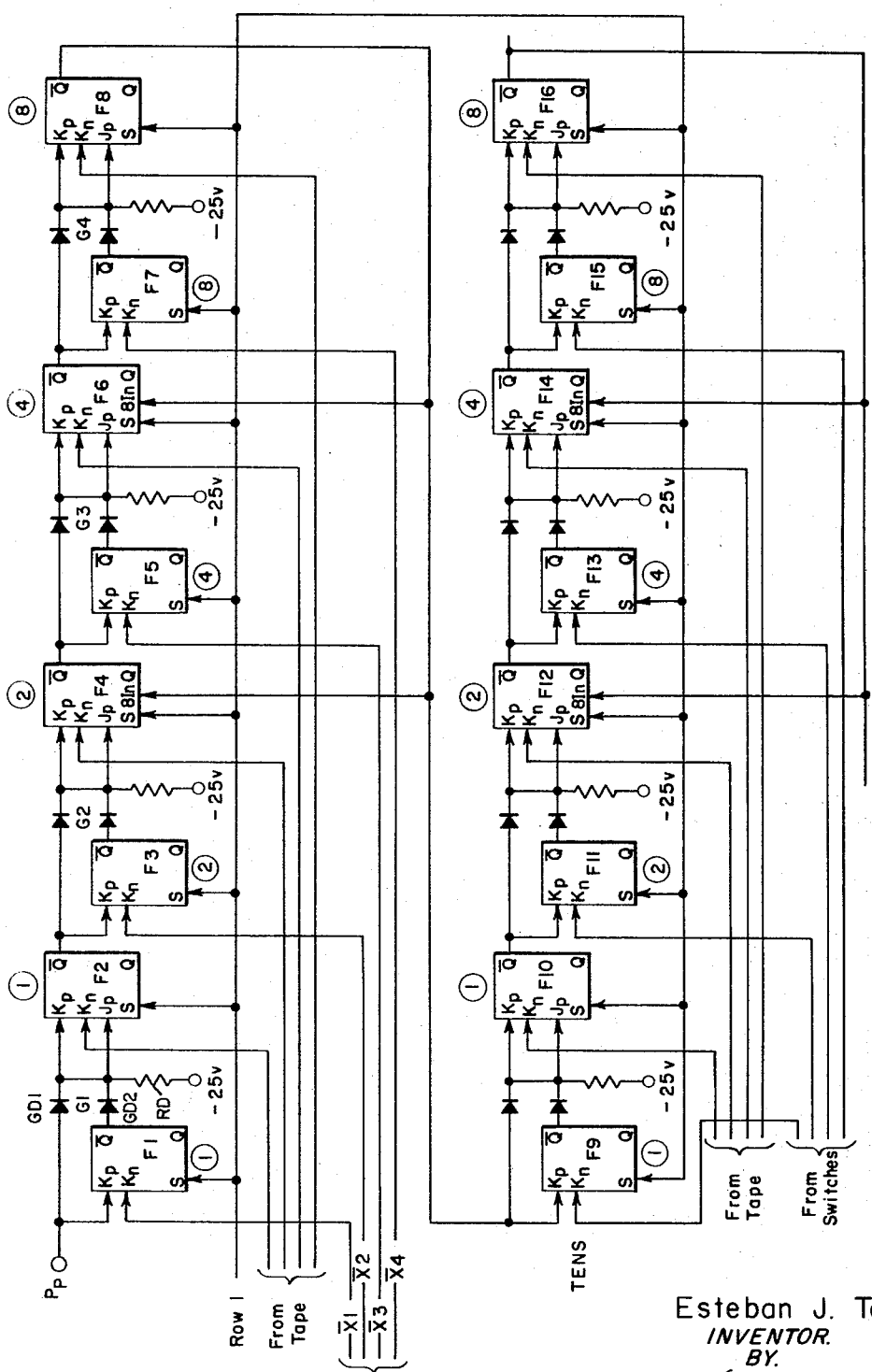
FIG. 2 is a block diagram specifically illustrating a count-down type of counter having a facility for adding two numbers and embodying the principles of this invention.

The details of a count-down type of counter embodying the principles of this invention are illustrated in FIG. 2.

As shown in Patent 3,252,147 to E. J. Toscano, supra, the count-down counter comprises a plurality of cascaded flip flops in which four flip flops are utilized for each of the units, tens, hundreds and thousands level, and two flip flops are in the ten thousands level to provide a total count, expressed as a decimal number of 39,999. The input pulses which are derived from the position count generator forming a part of the transducer system are applied through the $J_p$ and $K_p$ input terminals of the least significant (first) flip flop of the counter. The $\overline{Q}$ output circuit of each flip flop is coupled to the $J_p$ and $K_p$ input terminals of the next higher order level of flip flop providing triggering of each higher order of flip flop as the connected lower order flip flop goes from its "0" representing electrical state, in which the $\overline{Q}$ output voltage is in the lower of its two voltage states, to its "1" representing electrical state in which the $\overline{Q}$ output voltage swings from the lower of its two electrical states to the higher of its two electrical states, namely, about −2 volts to ground potential. Thus, at any time a lower order flip flop switches from its "0" or $\overline{Q}$ electrical state, a triggering voltage pulse is coupled to the $J_p$ and $K_p$ input terminals of the next higher order flip flop, causing this flip flop to change from the electrical state it is in to its opposite electrical state, whence the count is transmitted from one flip flop to another to achieve a count-down mode of operation.

This circuit concept for a count-down counter is incorporated in the circuit illustrated in FIG. 2 herein. In FIG. 2 only the units and tens level of a binary coded decimal count-down counter are shown, it being understood that the other levels of this counter may be connected in the manner demonstrated in these two counter levels. To this end, in the units section of the counter the flip flops F2, F4, F6 and F8 represent the standard counter flip flop corresponding, for instance, to the flip flops FQ$x$1 through FQ$x$4 in Patent 3,252,147 of E. J. Toscano, supra, and the flip flops F10, F12, F14 and F16 will correspond to the flip flops of the tens level, FQ$x$5 through FQ$x$8. In the units row in FIG. 2 herein control flip flops F1, F3, F5 and F7 are connected ahead of each of the counter flip flops F2, F4, F6 and F8 to provide a control of these counter flip flops for counting purposes, depending upon the amount of correction that is required in the dimension information that is being read from the tape. Similarly, flip flops F8, F11, F13 and F15 are connected ahead of each of the counter flip flops F10, F12, F14 and F16, respectively, in the tens level of the counter. The control of the counter flip flops by means of the control flip flop is accomplished by means of gating circuits which in the units level of the counter are designated G1, G2, G3 and G4, respectively, and which are arranged to be enabled in the presence of negative output voltages from the control flip flops F1, F3, F5 and F7, respectively. A similar set of gates couples the flip flops F9, F11, F13 and F15 to the respective counter flip flops in the tens level of the counter. The description of the operation of the flip flops in the units level of the counter will suffice for both levels.

As illustrated, and with particular reference to the gate G1 (this gate description applies to all of the other gates), each gate comprises a pull-down resistor RD having one terminal connected to −25 volts and the other terminal commonly connected to the cathodes of respective gate diodes GD1 and GD2. At such time as the output voltage of the $\overline{Q}$ terminal of flip flop F1 is at ground potential, the output of the gate is coupled to ground potential. At this time the application of a positive going voltage pulse $P_p$ swinging from some negative voltage, say −2 volts, to ground potential is inhibited at the output of the gate, that is, the voltage pulse does not drive the output of the gate above its existing static voltage level at about ground potential. At such time as the output $\overline{Q}$ terminal of the flip flop F1 is at the lower of its two voltage states, a voltage pulse coupled to the diode GD1 and swinging from some negative potential towards ground potential correspondingly raises the output of the gating circuit G1. This output is coupled to both the $J_p$ and $K_p$ input terminals of the flip flop F2 which, as described in connection with FIG. 2, causes this flip flop to change its electrical state. Thus, at any time the flip flop F1 is in its "0" representing electrical state ($\overline{Q}$=−2 volts), signals $P_p$ are gated by the gate G1 to the inputs $J_p$ and $K_p$ of the flip flop F2, and at such time as the flip flop F1 is in its "1" representing electrical state, the output of the terminal $\bar{Q}$ is high and the output of the gate G1 is high, which inhibits the pulses $P_p$ at the input terminals $J_p$ and $K_p$ of the flip flop F2.

Whenever the flip flop F1 is in its "1" representing electrical state, an input pulse $P_p$ applied to the $K_p$ input terminal thereof switches the flip flop F1 from its "1" representing electrical state to its "0" representing electrical state, thus enabling the gate. The second pulse $P_p$ which is applied is now gated to the flip flop F2, causing this flip flop to change its electrical state. By this expedient the flip flop F1 is effective in adding one count to the count-down operation. Similar considerations apply with respect to the flip flops F3, F5 and F7.

The flip flops of the counter are weighted 1, 2, 4 and 8 in each of the levels indicated and to achieve binary coded decimal counting the $\bar{Q}$ output of the flip flop F8 is coupled as input to terminals $8I_n$ of the flip flops F4 and F6. Thus, at any time that the flip flop F8 goes from its "0" representing electrical state to its "1" representing electrical state, signals are coupled to the terminals $8I_n$ of each of the flip flops F4 and F6 to set these flip flops to their "0" representing electrical states, if they are not already in such electrical states. Thus, in counting, the counter may exist momentarily in the configuration 1111 for the flip flops F2, F4, F6 and F8, respectively, but then, promptly, the flip flops F4 ad F6 are switched to their "0" representing electrical states, resulting in a counter configuration of the units level representing the decimal number "9." The tens level is similarly connected and thus undergoes similar configuration but is weighted ten times the units level and thus represents the decimal number "90" when in the 1001 configuration.

As described in Patent 3,252,147 of E. J. Toscano, supra, the counter flip flops F2, F4, F6 and F8 are set by the control afforded by relay RS whenever row 1 of the tape is being read. This applies −150 volts to the S terminal of each flip flop forcing transistor Q11 to conduct and setting each flip flop in its "1" representing electrical state. As further described in said Toscano application, the absence of a hole in the tape is effective to turn off any flip flop set in its "1" representing electrical state. Thus, the control from the tape coupled to the $K_n$ input terminal of each flip flop is effective to leave this flip flop in its "1" representing electrical state whenever there is a hole in the tape, or to turn off the flip flop with the absence of a hole in the tape. Thus, the counter may be set to a particular electrical configuration representing a particular decimal number corresponding to a dimension indicating the desired position of the part in a particular axis.

At the time the relay RS is energized, each of the flip flops F1, F3, F5, F7, F9, F11, F13, F15, etc., are also set in their "1" representing electrical states. If an offset correction is to be made this correction is then coupled to the input terminals $K_n$ of each of the control or correction flip flops. The introduction of such a correction may be obtained by means of a switch arrangement of the type illustrated in FIG. 3 and generally designated S. The switch S comprises a knob K which may be set to any one of the ten positions indicated 0 through 9 and is shown in position 7 providing a setting of 0.007 inch. The knob K is mechanically connected to each of the switch sections S1 through S4 and operates the movable switch elements thereof. The switches S1 through S4 are weighted 1, 2, 4 and 8 in correspondence with the weighting of the flip flops in the respective levels of the counter. Each switch is provided with two output terminals designated "1" and "0," respectively. Only the "0" output terminal is utilized in controlling the control flip flops. These terminals are identified $\bar{X}1$, $\bar{X}2$, $\bar{X}3$ and $\bar{X}4$, respectively, which legends are applied in the circuits coupled to the $K_n$ input terminals of the flip flops F1, F3, F5 and F7 in FIG. 4. The convention adopted here corresponds to that in controlling the flip flops from the tape, namely, at any time that a zero is represented in the position of a switch the particular flip flop coupled thereto is turned off.

Table I illustrates a typical condition and applies only to the units level of the counter. In this table it is assumed that the flip flops F2, F4, F6 and F8 are initially set to represent the decimal number 9, that is, 1001 reading F2 through F8, which in the units level represents 0.009 inch. The flip flops F1, F3, F5 and F7 are set to represent the decimal number 7 wherein the flip flops F1, F3 and F5 are each in their "1" representing electrical states and the flip flop F7 is in its "0" representing electrical state, representing 0.007 inch in the units level. Thus, prior to the application of a pulse $P_p$ to the input of the counter, the flip flops occupy the positions indicated in row zero of Table I. Since the flip flop F1 is in its "1" representing electrical state, the gate G1 is disabled and consequently the first pulse $P_p$ is not coupled to the flip flop F2 but is coupled only to the $K_p$ input terminal of the flip flop F1. The positive going voltage excursion at the base of transistor Q11 of this flip flop cuts off transistor Q11 and results in switching on of transistor Q12. The flip flop F1 now changes its electrical state and the $\bar{Q}$ output terminal goes from the higher of its two voltage states to the lower of its two voltage states, namely, about −2 volts. This enables the gate G1.

TABLE I

| Pulse No. | 1 | | 2 | | 4 | | 8 | |
|---|---|---|---|---|---|---|---|---|
| | F1 | F2 | F3 | F4 | F5 | F6 | F7 | F8 |
| 0 | | 1 | | 0 | | 0 | | 1 |
| | 1 | 1 | 1 | | 1 | | 0 | |
| 1 | | 1 | | 0 | | 0 | | 1 |
| | 0 | | 1 | 1 | 1 | | 0 | |
| 2 | | 0 | | 0 | | 0 | | 1 |
| | 0 | | 1 | 1 | 1 | | 0 | |
| 3 | | 1 | | 0 | | 0 | | 1 |
| | 0 | | 0 | | 1 | | 0 | |
| 4 | | 0 | | 0 | | 0 | | 1 |
| | 0 | | 0 | | 1 | | 0 | |
| 5 | | 1 | | 1 | | 0 | | 1 |
| | 0 | | 0 | | 0 | | 0 | |
| 6 | | 0 | | 1 | | 0 | | 1 |
| | 0 | | 0 | | 0 | | 0 | |
| 7 | | 1 | | 0 | | 0 | | 1 |
| | 0 | | 0 | | 0 | | 0 | |
| 8 | | 0 | | 0 | | 0 | | 1 |
| | 0 | | 0 | | 0 | | 0 | |
| 9 | | 1 | | 1 | | 1 | | 0 |
| | 0 | | 0 | | 0 | | 0 | |
| 10 | | 0 | | 1 | | 1 | | 0 |
| | 0 | | 0 | | 0 | | 0 | |
| 11 | | 1 | | 0 | | 1 | | 0 |
| | 0 | | 0 | | 0 | | 0 | |
| 12 | | 0 | | 0 | | 1 | | 0 |
| | 0 | | 0 | | 0 | | 0 | |
| 13 | | 1 | | 1 | | 0 | | 0 |
| | 0 | | 0 | | 0 | | 0 | |
| 14 | | 0 | | 1 | | 0 | | 0 |
| | 0 | | 0 | | 0 | | 0 | |

TABLE I—Continued

| Pulse No. | 1 | | 2 | | 4 | | 8 | |
|---|---|---|---|---|---|---|---|---|
| | F1 | F2 | F3 | F4 | F5 | F6 | F7 | F8 |
| 15 | | 1 | 0 | | 0 | | 0 | |
| | 0 | | 0 | | 0 | | 0 | |
| 16 | | 0 | 0 | | 0 | | 0 | |
| | 0 | | 0 | | 0 | | 0 | |

The second pulse $P_p$ is now coupled directly through the gate to the terminals $J_p$ and $K_p$ of the flip flop F2. Flip flop F2, as shown, was initially in its "1" representing electrical state and now is switched to its "0" representing electrical state in which condition its $\overline{Q}$ output terminal switches from its higher to its lower voltage state. This change in voltage in a negative going direction has no effect upon either of the flip flops F3 and F4. As will be seen by reference to Table I, the flip flop F3 is still in its "1" representing electrical state.

With the occurrence of the third voltage pulse $P_p$ the flip flop F2 is switched from its "0" representing electrical state to its "1" representing electrical state. The output voltage at the $\overline{Q}$ terminal of the flip flop F2 now switches in a positive going direction. This positive going voltage excursion is applied to the $K_p$ input terminal of the flip flop F3 and this flip flop now changes from its "1" representing electrical state, in which position it was initially set, to its "0" representing electrical state in which the output terminal $\overline{Q}$ is now in the lower of its two voltage states.

The occurrence of the fourth voltage pulse $P_p$ switches the flip flop F2 from its "1" representing electrical state to its "0" representing electrical state and no further action takes place.

With the fifth voltage pulse the flip flop F2 is now switched from its "0" to its "1" representing electrical state. The positive going excursion of the terminal $\overline{Q}$ of the flip flop F2 is now coupled through the enabled gate G2 to the input terminals $J_p$ and $K_p$ of the flip flop F4 and this flip flop, which was initially set in its "0" representing electrical state, is now switched to its "1" representing electrical state. The positive going excursion of the terminal $\overline{Q}$ of flip flop F4 which is coupled to the $K_p$ input terminal of the flip flop F5 switches this flop flop from its "1" representing electrical state, in which it was initially set, to its "0" representing electrical state and the switching action terminates with this change.

The cycle may now be followed through pulse No. 16, at which the count-down operation is completed, and all of the flip flops are in their "0" representing electrical state. These explanations with respect to the units level of the position counter apply equally to the tens, hundreds, thousands and ten thousands level of the counter of the type described in the Toscano application aforesaid.

Thus, it will be seen that the introduction of the control or correction flip flops in the circuit and the coupling of these flip flops through suitable gating circuits to the inputs of the counter flip flops for the purpose of controlling count-down counting operation provides an arrangement in which two numbers may be conveniently added in a count-down type of counter with a minimum of equipment.

Although the explanations which have been made hereinabove apply particularly to count-down counters, it will be understood that these principles are generally applicable to a one-way type of counter, whether it be set for count-down operation or count-up operation. For instance, the counter illustrated herein is conveniently changed to a count-up type of counter by the simple expedient of connecting the Q output terminal of each flip flop to the $J_p$, $K_p$ terminal of the next higher level flip flop in the counter chain so that the occurrence of a pulse $P_p$ at the input $J_p$, $K_p$ of flip flop F2 switching this flip flop, say from its "1" representing electrical state to its "0" representing electrical state, is now instrumental in triggering the next higher order flip flop to change its electrical state. The control flip flops F1, F3, F5, etc., will be coupled in the manner illustrated to similar gating circuits in order to control the count-up operation. Thus, at any time a control flip flop is switched from its "1" state to its "0" state a gate will again be enabled to effect switching of the connected counter flip flop.

Additionally, a binary coded decimal counter is not needed. For instance, the connections from the $\overline{Q}$ output terminals of the flip flops F8 and F16 to the $8I_n$ input terminals of the respective pairs of flip flops F4, F6 and F12, F14 may be removed to provide a straight binary circuit.

Further, while all flip flops are initially set in their "1" representing electrical states and then selectively turned off, if count-up control is provided, they may be initially set to "0" representing electrical state and then only selected control flip flops are turned on.

Figure 3:
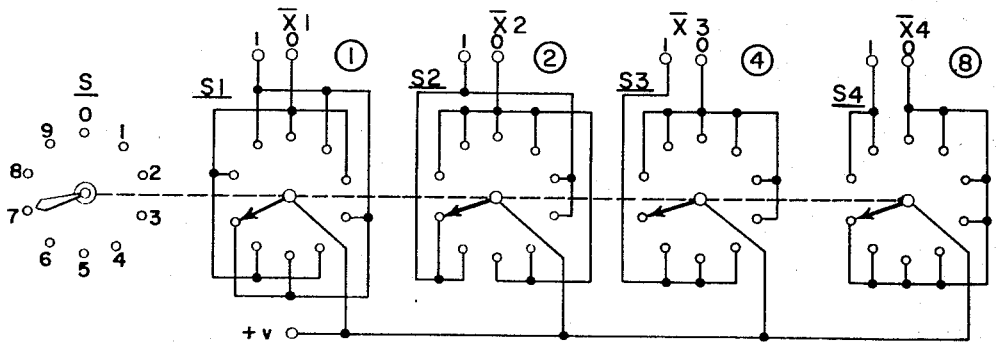
FIG. 3 is an electrical circuit schematically depicting a manually operated switch system for generating discrete electrical signals employed for controlling selected flip-flops of the counter of FIG. 2.

By the arrangement provided herein a simple and effective control of a numerically controlled positioning system for providing offset in any degree needed within system limits is achieved. The particular arrangements whereby this may be accomplished, which have been disclosed herein, are subject to modification depending upon the types of components which are employed, for instance, the type of flip flop illustrated herein is a transistor flip flop and utilizes a negative voltage state to represent the true state of a particular output terminal. Positive voltage states may be employed. Similarly, transistors need not be used in mechanizing the flip flops and other elements of the circuit. Vacuum tubes may be employed and other types of switching devices, such as magnetic devices, are equally applicable. The use of a switching circuit of the type illustrated in FIG. 3 illustrates one of several types of devices which may be employed and, again, may be modified in accordance with particular needs. It is, therefore, intended that the foregoing disclosure shall be considered only as illustrative of the principles of this invention and not construed in a limiting sense.

What is claimed is:
1. A counter, comprising:
   a plurality of counter flip flops, each having an input circuit and an output circuit;
   respective gate circuits coupling the output circuit of each flip flop, except the last, to the input circuit of the next higher order flip flop;
   a plurality of control flip flops, each, except the lowest order control flip-flops, having an input circuit coupled to an output circuit of a counter flip flop and each having an output circuit coupled to the gate circuit to which that counter flip flop output circuit is connected;
   and means for coupling signals to that gate circuit coupled to the lowest order counter flip-flop and to the input circuit for the lowest order control flip-flop, for operating said counter.
2. A counter, comprising:
   a plurality of counter flip flops, each having an input circuit and an output circuit;
   respective gate circuits coupling the output circuit of each flip flop, except the last, to the input circuit of the next higher order flip flop;
   a plurality of control flip flops, each having an input circuit coupled to an output circuit of a counter flip flop and having an output circuit coupled to the gate to which that counter flip flop output circuit is connected;
   and means coupled to said flip flops for selectively setting said flip flops in predetermined electrical states.

3. A counter, comprising:
a plurality of counter flip flops, each having an input circuit and an output circuit;
respective gate circuits coupling the output circuit of each counter flip flop, except the last, to the input circuit of the next higher order flip flop;
a plurality of control flip flops, each having an input circuit coupled to an output circuit of a counter flip flop and having an output circuit coupled to the gate to which that counter flip flop output circuit is connected;
means coupled to said counter flip flops and to said control flip flops for setting said flip flops in the same electrical state;
means coupled to said counter flip flops for selectively resetting said counter flip flops;
and means coupled to said control flip flops for selectively resetting said control flip flops.

4. A counter, comprising:
a plurality of counter flip flops, each having an input circuit and an output circuit;
respective gate circuits coupling the output circuit of each flip flop, except the last, to the input circuit of the next higher order flip flop;
a plurality of control flip flops, each having an input circuit coupled to an output circuit of a counter flip flop and having an output circuit coupled to the gate to which that counter flip flop output circuit is connected;
means coupled to said counter flip flops for setting said counter flip flops in the same electrical states;
means coupled to said control flip flops for setting said control flip flops in the same electrical states;
means coupled to said counter flip flops for resetting selected counter flip flops;
and means coupled to said control flip flops for resetting selected control flip flops.

5. A counter, comprising:
a plurality of counter flip flops, each having an input circuit and an output circuit;
respective gate circuits coupling the output circuit of each flip flop, except the last, to the input circuit of the next higher order flip flop;
a plurality of control flip flops, each having an input circuit connected to an output circuit of a counter flip flop and having an output circuit coupled to the gate to which that counter flip flop output circuit is connected;
means coupled to said counter flip flops and to said control flip flops for setting said flip flops in their "1" representing electrical states;
means coupled to said counter flip flops for selectively resetting selected flip flops to their "0" representing electrical states;
and means coupled to said control flip flops for selectively resetting selected control flip flops to their "0" representing electrical states.

6. A counter, comprising:
a plurality of counter flip flops, each having an input circuit and an output circuit;
respective gate circuits coupling the output circuit of each flip flop, except the last, to the input circuit of the next higher order flip flop;
a plurality of control flip flops, each having an input circuit coupled to an output circuit of a counter flip flop and having an output circuit coupled to the gate to which that counter flip flop output circuit is connected;
means coupled to said counter flip flops and to said control flip flops for setting said flip flops to their "0" representing electrical states;
means coupled to said counter flip flops for selectively resetting selected flip flop counters to their "1" representing electrical states;
and means coupled to said control flip flops for selectively resetting selected control flip flops to their "1" representing electrical states.

References Cited
UNITED STATES PATENTS 3,020,481   2/1962   Hulst _____ 328—42

ARTHUR GAUSS, *Primary Examiner.*

S. D. MILLER, *Assistant Examiner.*